W. P. PATTON
Injector.
No. 162,852.
Patented May 4, 1875.
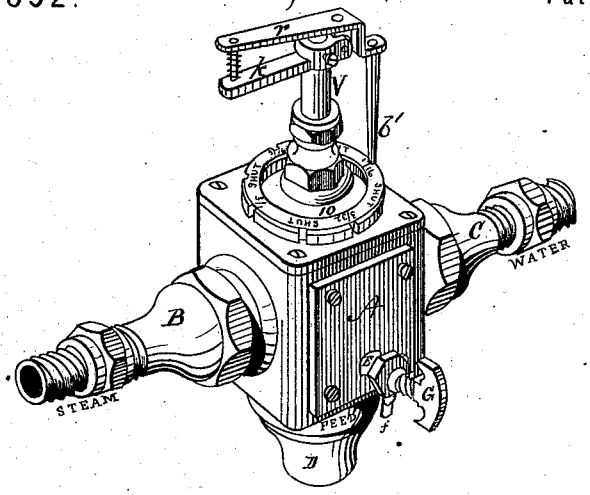
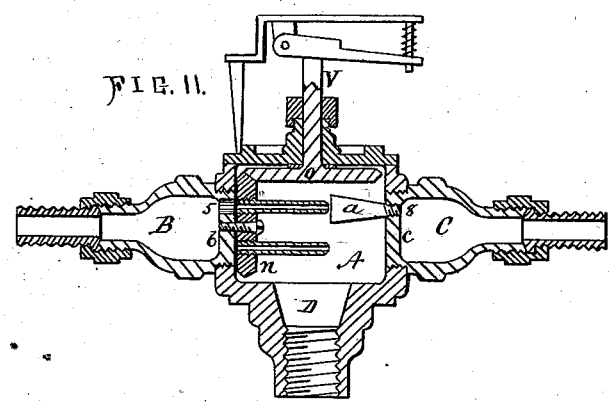
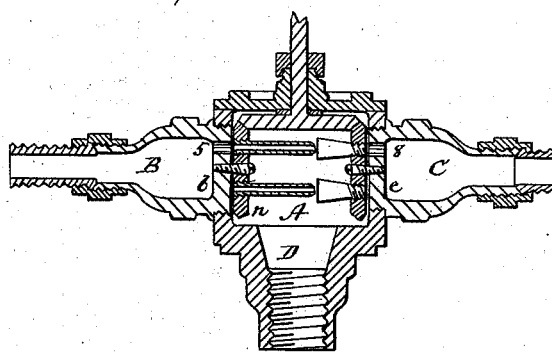
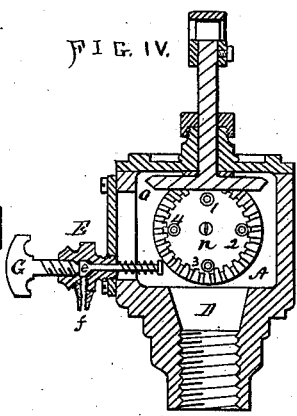
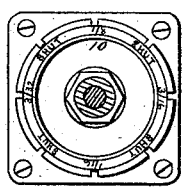
WITNESSES.
F. B. Townsend,
Will H moxon
INVENTOR.
William P. Patton
per Attys.
A. H. Evans & Co.

UNITED STATES PATENT OFFICE.

WILLIAM P. PATTON, OF HARRISBURG, PENNSYLVANIA, ASSIGNOR TO HIMSELF AND SULLIVAN S. CHILD, OF SAME PLACE.

IMPROVEMENT IN INJECTORS.

Specification forming part of Letters Patent No. 162,852, dated May 4, 1875; application filed April 3, 1875.

*To all whom it may concern:*

Be it known that I, WILLIAM P. PATTON, of Harrisburg, Dauphin county, Pennsylvania, have invented certain new and useful Improvements in Injectors, of which the following is a clear, full, and exact description, reference being had to the accompanying drawings, making a part of this specification, in which—

Figure 1 is a perspective of an injector with my improvements attached. Fig. 2 is a longitudinal vertical section of the same. Fig. 3 is a similar view, showing a modification. Fig. 4 is a vertical cross-section through $x$ $x$. Fig. 5 is a top view of notched plate.

My invention relates to injectors as a class, but more particularly to the injector used as a feed-water for steam-boilers; and it consists, first, in the mode of adjustment, by an arrangement of nozzles of different sizes within the injector-chamber; secondly, in the manner of operating these nozzles so as to bring them at will between the steam and exit passages; thirdly, in the indicator, to show the position of the several nozzles at any moment; and, fourthly, in the construction and arrangement of an alarm-cock.

To enable others skilled in the art to make and use my invention, I will proceed to describe the exact manner in which I have carried it out.

In the said drawings, A represents the injector-chamber, B the steam-pipe, and C the exit or water-pipe. The inner ends of these pipes are closed by the solid circular disks $b$ $c$, through the upper portions of which, and opposite to each other, are the steam-passage 5 and the exit-passage 8. Concentrically pivoted to the disk $b$, and within the injector-chamber A, is the rotary geared disk $n$, actuated by the miter-wheel $o$ on the shaft V. This rotary disk is perforated near its outer edge with four holes of unequal sizes, and so located that as the disk rotates each hole will in turn be brought to a position immediately opposite to the steam-passage 5. It is evident that the number of holes may be increased or diminished, and thus increase or diminish the range of adjustability. To each of these openings is rigidly attached a steam-nozzle of corresponding size, and as the disk $n$ is revolved, the several steam-nozzles, or any sized nozzle desired, can be brought opposite to the steam-passage 5, and consequently opposite to the exit-passage 8. To the exit-passage 8 and within the chamber A is rigidly secured the receiving-nozzle $a$, as shown in Fig. 2. It is evident that instead of the one receiving-nozzle fixed rigidly to the disk $c$, in order to bring different sized nozzles opposite to a fixed receiving-nozzle, a second rotary disk, like the disk $n$, may be concentrically pivoted to the disk $c$, and a number of receiving-nozzles attached, as shown in Fig. 3, corresponding in size and number to the steam-nozzle without departing from the spirit of my invention, as the principle and method of action is the same.

On the shaft V is attached the spring-handle $r$ $k$ carrying the leg $b'$, which enters the notches in the cap-plate 10. These notches are made to correspond to the relative positions of the nozzles 1 2 3 4, so that when the handle is turned around and the leg enters a notch, a nozzle is brought in line with the steam-passage 5 and the receiving-nozzle $a$. Figures on the notches indicate the size of the nozzle in position when the leg $b'$ enters any one of them. Thus the person in charge can quickly, and with absolute certainty, adjust the injector by simply moving the leg $b'$ around the notched plate 10. It will be noticed that notches intervene between the numbered notches on the plate. When the leg $b'$ enters either of these intervening notches the steam-passage 5 is closed, as one nozzle has been moved from the passage and another has not reached it. During this time the passage is closed by the solid body of the rotary disk $n$. D is the inlet-pipe for the feed-water, and E the indicator or alarm-cock. When the injector fails to operate properly a pressure is created in the injector-chamber A, which forces back the valve $e$ and allows the steam to escape through the outlet-pipe $f$, to give the alarm to the engineer. As long as the injector works properly a suction exists in the chamber, and the valve $e$ remains undisturbed. When the feed-water is taken from a heater or from water-mains where there is a strong pressure, the plug G must be moved down upon the valve e, and be drawn back only when it is desired to test the working of the injector.

Having thus explained my invention, what I claim as new, and desire to secure by Letters Patent, is—

1. In an injector, the rotary disk n, provided with two or more nozzles, substantially as and for the purpose set forth.

2. In an injector, the rotary disk n provided with two or more steam-nozzles, constructed as described, in combination with the steam-passage 5 and receiving-nozzle a, substantially as and for the purpose described.

3. The spring-handle r k, provided with the leg b' and shaft V, in combination with the wheel o and disk n provided with different sized nozzles, subtantially as set forth.

4. The notched plate 10 and leg b' in combination with the spring-handle r k, shaft V, miter-wheel o, and disk n provided with the nozzles, substantially as and for the purpose set forth.

5. In combination with an injector the alarm-cock E, consisting of the valve e, screw G, and outlet-pipe f, constructed to operate substantially as and for the purpose set forth.

WM. P. PATTON.

Witnesses:
EUGENE SNYDER,
CASPER S. BIGLER.